UNITED STATES PATENT OFFICE.

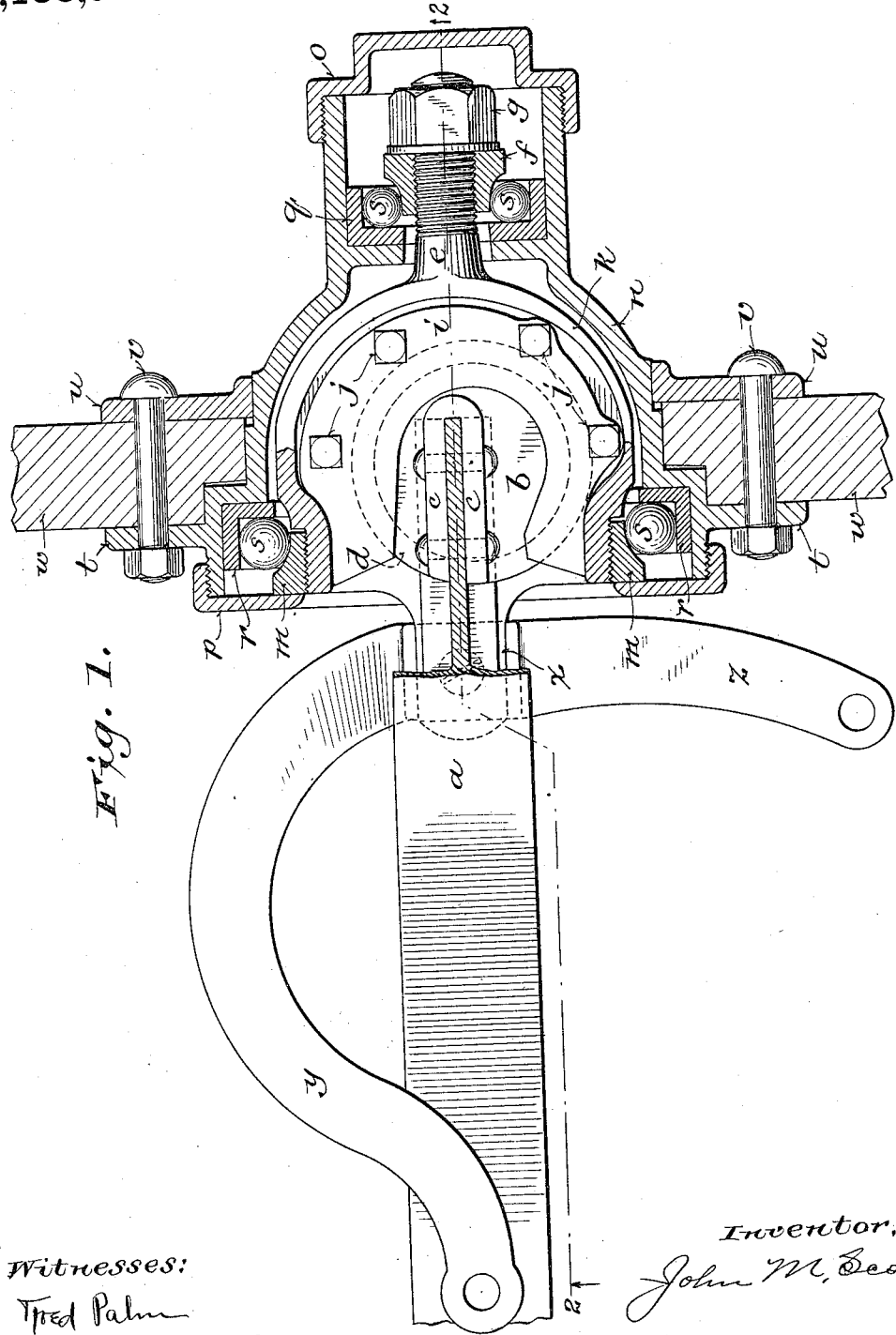

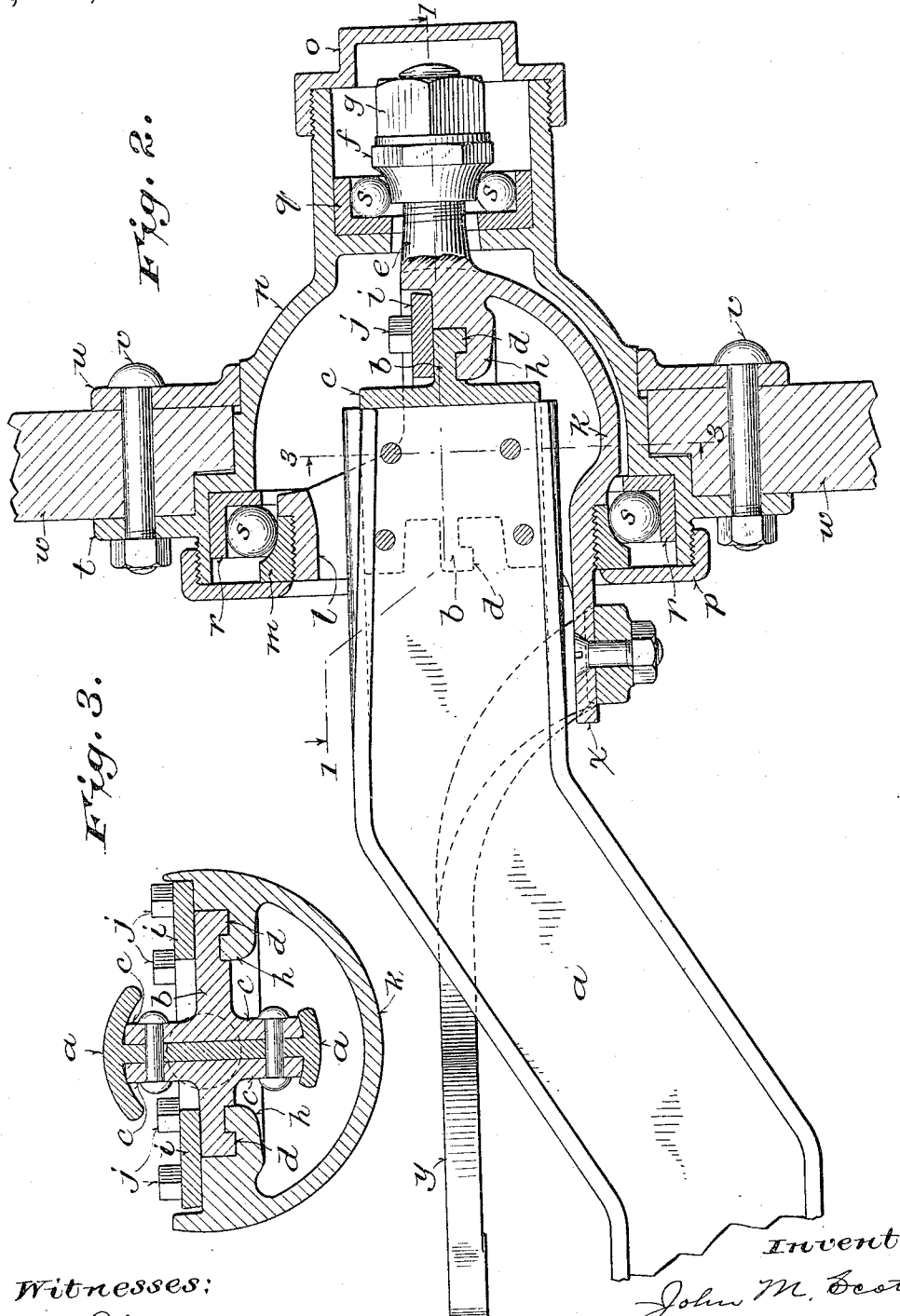

JOHN M. SCOTT, OF RACINE, WISCONSIN.

STEERING-GEAR FOR MOTOR-VEHICLES.

1,153,961.  Specification of Letters Patent.  Patented Sept. 21, 1915.

Application filed December 16, 1911.  Serial No. 666,204.

*To all whom it may concern:*

Be it known that I, JOHN M. SCOTT, a citizen of the United States, residing at Racine, in the county of Racine and State of Wisconsin, have invented certain new and useful Improvements in Steering-Gear for Motor-Vehicles, of which the following is a specification, reference being had to the accompanying drawing, forming a part thereof.

This invention relates to motor vehicles having front wheel spindles pivoted to the ends of a relatively fixed axle and connected so as to be turned simultaneously forward and back for steering the vehicles. Its main objects are to provide strong, durable, easily operated and reliable bearings of this class.

It consists in the construction, arrangement and combination of parts as hereinafter particularly described and defined in the claims.

In the accompanying drawing like characters designate the same parts in the several figures.

Figure 1 is a plan view and horizontal section indicated generally by the dotted line 1 1, Fig. 2, of one of the wheel bearings of a steering gear embodying the invention; Fig. 2 is a vertical section of the same, indicated generally by the dotted line 2 2, Fig. 1; and Fig. 3 is a vertical cross section on the line 3 3, Fig. 2.

The front axle $a$, carried by the steering wheels, is preferably made as shown, of T-section, with the wider flange at the top and with its ends adjacent to the wheels bent upwardly. At each end the axle is provided with a substantially circular and horizontally disposed plate or bearing $b$, which is formed with transverse vertical plates $c$ connected with each other at their outer ends and spaced to receive and embrace the web of the axle to which they are bolted or riveted, said plates abutting at their upper and lower edges against the top and bottom flanges of the axle. The wheel bearings at both ends of the axle being alike, but one of them is shown and will be described.

The plate or bearing $b$ is formed on the under side with a circular tongue or flange $d$, next to its periphery. The wheel spindle $e$, which is provided at its outer end with an adjustable ball race $f$ and nut $g$, threaded thereon in the usual manner, is formed at its inner end with a grooved segmental bearing $h$, fitted and adapted to turn horizontally on the rim of the plate or bearing $b$, to which it is secured by a segmental cap plate $i$, fastened by bolts or screws $j$ to the upper face of the bearing $h$, and projecting over the upper face of the plate or bearing $b$. The spindle is also formed with a quarter-spherical extension $k$ around and below the bearing $h$, and this extension terminates at its inner end in a vertical ring $l$, which surrounds the axle $a$. On this ring $l$ is threaded or otherwise secured, an annular ball race or bearing $m$. As shown in Figs. 1 and 3, the center or vertical axis of the plate or bearing $b$ and of the bearing $h$ is eccentric to or located in advance of the axis of the spindle $e$, so that the wheel mounted on said spindle will tend, like a caster wheel, to run in a straight course.

The hollow or recessed wheel hub $n$, having a cylindrical outer end, is formed with an enlarged approximately hemi-spherical inner end corresponding in contour with and adapted to surround and partially inclose the quarter-spherical extension $k$ of the spindle with the end of the axle $a$ and the pivot bearings $b$ and $h$. At its outer end the hub is provided with a cap nut $o$, and at its inner end with a flanged ring $p$ threaded thereon, said ring extending inwardly over the ball race or bearing $m$. The hub is also provided on opposite sides of the central vertical plane of the wheel with interior ball races or bearings $q$ and $r$, between which and the opposing races or bearings $f$ and $m$ on the spindle balls $s$ are interposed. The hemi-spherical portion of the hub is provided on the outer side with fixed and removable flanges $t$ and $u$ connected by bolts $v$ for clamping and holding the inner ends of the spokes $w$ in place.

To an inwardly projecting lug or ear $x$ on the under side of the spherical extension $k$ of the spindle, is bolted or otherwise fastened, an arm $y$, which is connected in the usual or any suitable manner, with the steering handle of the vehicle, and an arm $z$, which is connected with a similar arm at the opposite end of the axle, for turning the steering wheels simultaneously in either direction on their pivot bearings $b$ and $h$. The flanges at the ends of the axle $a$ are preferably curved, as shown in Figs. 2 and 3, to avoid unduly enlarging the inner spherical end of the hub and at the same time interfering with the turning of the spindles $e$ on the bearings $b$ and $h$ to the necessary or desired extent for steering.

The center or vertical axis of the bearings $b$ and $h$ on which the spindle $e$ turns, preferably coincides, as shown, with the central vertical plane of the wheel or wheel rim.

The bearings $b$ and $h$ and cap plate $i$, having extended engaging or working faces at a distance from and partially surrounding the center or vertical axis on which the spindle $e$ turns in steering, afford a firm, substantial support for the wheel, and an easily operated and reliable pivot connection between the wheel and axle.

The construction and arrangement of parts are such that while the bearings are readily accessible for lubrication by oil or grease cups or other means, they are practically inclosed and protected from dust and dirt.

The parts of the device designed as shown, are simple, strong, durable and easily constructed and assembled. Various modifications in minor details of construction may however, be made, within the scope of the invention, without affecting the principle and mode of operation of the device.

I claim:

1. In steering gear for motor vehicles, the combination of an axle having a horizontally disposed circular plate fixed to the end thereof, a wheel spindle having a segmental bearing fitting over and adapted to turn on the rim of said plate, said plate and bearing being formed with interfitting tongues and grooves concentric with their vertical axes and the bearing being provided with a detachable segmental cap for confining the plate therein, and a recessed wheel hub rotatably mounted on said spindle and extending inwardly over and surrounding said plate and bearing.

2. In steering gear for motor vehicles, the combination of an axle having a horizontally disposed substantially circular pivot bearing plate, a wheel spindle having a segmental bearing fitting over and adapted to turn on the rim of said plate, one of said parts being formed on one side thereof with a curved tongue concentric with its axis and fitting into a corresponding groove in the other part, and a recessed wheel hub rotatably mounted on said spindle and extending inwardly over and surrounding said plate and bearing.

3. In steering gear for motor vehicles, the combination of an axle provided at the end with a substantially circular horizontally disposed and concentrically tongued plate, a spindle having a segmental concentrically tongued bearing fitted to engage with and turn on the tongued rim of said plate and provided with a detachable cap for securing it in place thereon, and a recessed wheel hub rotatably mounted on said spindle and extending inwardly over and surrounding said plate and bearing.

4. In steering gear for motor vehicles, the combination of an axle provided at the end with a substantially circular horizontally disposed plate, a spindle provided with a segmental bearing secured in engagement with and adapted to turn on the rim of said plate and provided with a ball bearing adjacent to its outer end and formed around and below said segmental bearing with a quarter spherical extension terminating at its inner end in a ball bearing surrounding the axle, and a hollow wheel hub provided with ball bearings surrounding those on said spindle and provided at its inner end with a removable flanged ring extending inwardly over the inner ball bearings.

5. In steering gear for motor vehicles, the combination of an axle provided at the ends with substantially circular horizontal tongued and grooved bearings, wheel spindles having eccentric tongued and grooved segmental bearings secured and adapted to turn horizontally on the rims of said circular bearings, said spindles being also provided with ball bearings, the inner bearings surrounding the ends of the axle, hollow wheel hubs inclosing said spindles and bearings and provided on opposite sides of the central vertical planes of the wheels with ball bearings surrounding the ball bearings on the spindles and operating arms rigidly attached to inwardly projecting extensions of the spindles.

In witness whereof I hereto affix my signature in presence of two witnesses.

JOHN M. SCOTT.

Witnesses:
 CHAS. L. GOSS,
 ALICE E. GOSS.